(12) United States Patent
Mason

(10) Patent No.: US 7,784,610 B2
(45) Date of Patent: *Aug. 31, 2010

(54) PROTECTIVE FILM APPLICATION KIT AND METHOD

(76) Inventor: Andrew Mason, 1239 Glenview La., Glendora, CA (US) 91702

( * ) Notice: Subject to any disclaimer, the term of this patent is extended or adjusted under 35 U.S.C. 154(b) by 205 days.

This patent is subject to a terminal disclaimer.

(21) Appl. No.: 12/156,879

(22) Filed: Jun. 4, 2008

(65) Prior Publication Data

US 2009/0301907 A1    Dec. 10, 2009

Related U.S. Application Data

(63) Continuation-in-part of application No. 11/394,807, filed on Apr. 1, 2006, now Pat. No. 7,389,869.

(51) Int. Cl.
| | |
|---|---|
| B65D 71/00 | (2006.01) |
| B65D 73/00 | (2006.01) |
| B44C 1/175 | (2006.01) |
| H01J 29/89 | (2006.01) |
| A46B 11/00 | (2006.01) |

(52) U.S. Cl. .................. 206/230; 156/230; 206/461; 206/576; 313/479; 313/512; 401/125; 401/130

(58) Field of Classification Search ......... 206/229–231, 206/461, 471, 568, 576; 156/230, 236; 313/478, 313/479, 512; 359/580, 590, 609; 401/123, 401/125, 130; 428/40.1; 345/173

See application file for complete search history.

(56) References Cited

U.S. PATENT DOCUMENTS

| | | | |
|---|---|---|---|
| 5,132,588 A | 7/1992 | Warman | |
| 5,677,050 A | 10/1997 | Bilkadi et al. | |
| 5,730,644 A * | 3/1998 | Pfanstiehl | .................. 206/229 |
| 5,820,957 A | 10/1998 | Schroeder et al. | |
| 6,142,868 A * | 11/2000 | Pfanstiehl | .................. 206/229 |
| 6,250,765 B1 | 6/2001 | Murakami | |
| 6,372,313 B1 * | 4/2002 | D'Alessio et al. | ........... 206/229 |
| 6,613,411 B2 | 9/2003 | Kollaja et al. | |
| 6,614,423 B1 * | 9/2003 | Wong et al. | .................. 345/173 |
| 6,802,416 B1 * | 10/2004 | D'Alessio et al. | ........... 206/229 |
| 6,831,714 B2 | 12/2004 | Masaki et al. | |
| 6,841,190 B2 | 1/2005 | Liu et al. | |
| 6,878,425 B1 | 4/2005 | Gomes | |
| 6,960,040 B2 * | 11/2005 | D'Alessio et al. | ........... 206/205 |
| 2005/0022924 A1 * | 2/2005 | Blackburn | .................. 156/230 |

* cited by examiner

*Primary Examiner*—Bryon P Gehman
(74) *Attorney, Agent, or Firm*—Gene Scott; Patent Law & Venture Group

(57) ABSTRACT

A kit apparatus has a package holding at least one film sheet having an adhesive layer on one side, a bottle containing a solution for activating the adhesive layer of the film sheet, and a miniature squeegee. The film sheet, bottle of solution and squeegee are secured within the package. The sheet corresponds in extent to a surface of an electronic device, preferably a surface of a display device of the electronic device. The solution is used for initially cleaning the surface that is to receive the sheet and finally to wet the adhesive layer in order to secure the sheet in place. Excess solution is removed from the surface while evenly distributing the adhesive using wiping motions with the squeegee.

11 Claims, 3 Drawing Sheets

PROTECTIVE FILM APPLICATION KIT AND METHOD

CROSS-REFERENCE TO RELATED APPLICATIONS

This is a Continuation-In-Part application of now U.S. patent application Ser. No. 11/394,807, filed Apr. 1, 2006, now U.S. Pat. No. 7,389,869, and claims this date for common matter therewith.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

REFERENCE TO A "MICROFICHE APPENDIX"

Not applicable.

BACKGROUND OF THE INVENTION

1. Field of the Present Disclosure

This disclosure relates generally to protective film overlays on surfaces and more particularly to a kit and method of use for enabling the installation of such a film on an electronic device and especially its display such as used on cell phones and the like.

2. Description of Related Art Including Information Disclosed Under 37 CFR 1.97 and 1.98

Warman, U.S. Pat. No. 5,132,588, discloses a viewing screen protective shield that is removably securable in association with a viewing screen, such as LCR screens, as found in fish finders and the like, which are typically exposed to adverse weather conditions. The protective shield is readily removable and replaceable and include convex peripheral edges to conform the shield to the convex screen with an outwardly extending tab formed outwardly of a single corner of the shield to enhance manual grasping thereof. To enhance securement of the shield to the associated screen, a plurality of transparent adhesive strips may be secured to an interior surface of the shield to enhance securement of the transparent shield to the associated screen.

Bilkadi et al., U.S. Pat. No. 5,677,050, discloses a retroreflective sheeting having an abrasion-resistant ceramer coating that is prepared from about 20% to about 80% ethylenically unsaturated monomers; about 10% to about 50% of acrylate functionalized colloidal silica; and about 5% to about 40% N,N-disubstituted acrylamide or N-substituted-N-vinylamide monomer having a molecular weight between 99 and 500 atomic mass units; wherein the percentages are weight percents of the total weight of the coating. A method of coating retroreflective sheeting with an abrasion-resistant cured ceramer layer is also disclosed.

Schroeder et al., U.S. Pat. No. 5,820,957, discloses an anti-reflective film construction that contains an optically transparent polymeric film having a textured surface and an optically transparent adhesive, the film construction configured to exhibit light transmission of greater than about 70 percent and 60. degree gloss measurement of between about 15 and 100. Methods of producing such film constructions and methods of reducing reflection from a surface are also described.

Murakami, U.S. Pat. No. 6,250,765, discloses an antiglare sheet for use with a display of a portable game machine that includes a film element serving as an antiglare film; an adhesive element adapted to affix the film element to a display screen; and a ventilation opening adapted to ventilate a space defined by the display screen and the film element.

Kollaja et al., U.S. Pat. No. 6,613,411, discloses a multilayer sheet material that comprises a film, and adhesive layer and an optional release liner. The film is a polyester blend comprising first and second polyesters that are substantially amorphous and possess certain physical properties including softening temperature, E-modulus, elongation and residual stress.

Masaki et al., U.S. Pat. No. 6,831,714, discloses a protective diffusion film, which does not scratch a lens film and a liquid crystal display device, does not become a refuse source or the like, and also has a suitable level of concealment effect, a process for producing the same, a surface light source device, and a liquid crystal display device. This protective diffusion film is used in a surface light source device provided with a lens film wherein the protective diffusion film is provided on a light outgoing surface of the lens film, and comprises: a transparent substrate layer; and a protective diffusion layer which is provided on the transparent substrate layer in its surface at least on the lens film side, has fine concaves and convexes on its surface, protects members which come into contact with the protective diffusion film, and is light diffusive.

Liu et ah, U.S. Pat. No. 6,841,190, discloses an antisoiling hardcoated film comprising a substantially transparent substrate, a hardcoat layer comprising inorganic oxide particles dispersed in a binder matrix, and an antisoiling layer comprising a perfluoropolyether. The antisoiling layer can be very thin, thus reducing the cost of the perfluoropolyether. The film has very good scratch, smudge and glare resistance and very good interlayer adhesion and durability. The film can be in the form of a single flexible substrate or a stack of such substrates. The film or stack can be sized to fit the display screen of an electronic display device such as a personal digital assistant or cell phone.

Gomes, U.S. Pat. No. 6,878,425, discloses a polarized filter film having a plurality of light-filtering layers, each having a different polarization aperture and tint hue that can be selectively combined to form a polarized filter film having a combined opacity rating of 5% to 55% when applied to a transparent medium such as a window. The combined polarized filter film is comprised of a plurality of layers of light-filtering material wherein each layer has a plurality of apertures positioned either vertically or angularly so that the horizontal rays associated with glare are reduced dramatically. Each layer of film has a plurality of slotted apertures that is biased or offset from the overlaying light-filtering film apertures whereby varying degrees of light-blocking properties can be achieved by using the light-filtering films in conjunction with additional layers. The present invention is attached to the transparent medium by using an adhesive which has a removable protective backing layer.

Sherman, EP 0539099, discloses a repositionable, self-adhering optical laminate having a thin film optical coating, an organic hardcoat, a thin plastic film substrate, an optical quality, pressure sensitive adhesive and, preferably, a release liner. The pressure-sensitive adhesive is low modulus, self-wetting elastomer which readily wets glass and plastic surfaces such as video display screens, promoting bubble-free mounting. The adhesive has low tack so that bubbles can be removed easily and the laminate can be totally or partially removed and reapplied to correct its positioning and/or to remove bubbles, dirt, etc.

The related art described above discloses a variety of films and coatings for mechanical protection of underlying surfaces, for anti-reflection and for UV protection. However, the prior art fails to disclose a compact kit providing the materials and tools necessary for applying such a film to a surface. The present disclosure distinguishes over the prior art providing heretofore unknown advantages as described in the following summary.

BRIEF SUMMARY OF THE INVENTION

This disclosure teaches certain benefits in construction and use which give rise to the objectives described below.

The types of surfaces that the present invention is designed to protect are any of the electronic surfaces and especially the displays known in the art such as for cell phones, computers, calculators and the like. Such surfaces are subject to scratches and to the accumulation of debris such as dust and dirt of various kinds. In normal use, these displays tend to be scratched when touched, and during cleaning. Therefore, it is desirable to apply a protective sheet over such surfaces. However, devices are not commonly provided with protective layers and users are not equipped or skilled in the practice of applying such protective sheets. Therefore, the present invention is designed to provide the materials, tools and instructions for enabling a person to apply a protective layer to the surfaces of electronic devices and especially display screens. The invention is provided as a kit of materials and tools. It is preferably provided with a molded support card or other package for holding a plurality of film sheets each having an adhesive layer on one side, a spray bottle containing a cleaning and activating solution enabled for activating the adhesive layers of the film sheets, and a squeegee. The film sheets, the squeegee, and the spray bottle are secured in the package in a manner that allows them to be easily removed for applications.

A primary objective inherent in the above described apparatus and method of use is to provide advantages not taught by the prior art.

Another objective is to provide all of the items necessary to apply a protective sheet to the surface(s) of an electronic device and display.

A further objective is to provide such a kit that may be used at least several times and has a support card that is useful for retail display as well as for storing the materials and tools necessary to accomplish its task.

Other features and advantages of the present invention will become apparent from the following more detailed description, taken in conjunction with the accompanying drawings, which illustrate, by way of example, the principles of the presently described apparatus and method of its use.

BRIEF DESCRIPTION OF THE SEVERAL VIEWS OF THE DRAWING(S)

Illustrated in the accompanying drawing(s) is at least one of the best mode embodiments of the present invention In such drawing(s):

DETAILED DESCRIPTION OF THE INVENTION

The above described drawing figures illustrate the described apparatus and its method of use in at least one of its preferred embodiment, which is further defined in detail in the following description. Those having ordinary skill in the art may be able to make alterations and modifications to what is described herein without departing from its spirit and scope. Therefore, it must be understood that what is illustrated is set forth only for the purposes of example and that it should not be taken as a limitation in the scope of the present apparatus and method of use.

Figure 1:
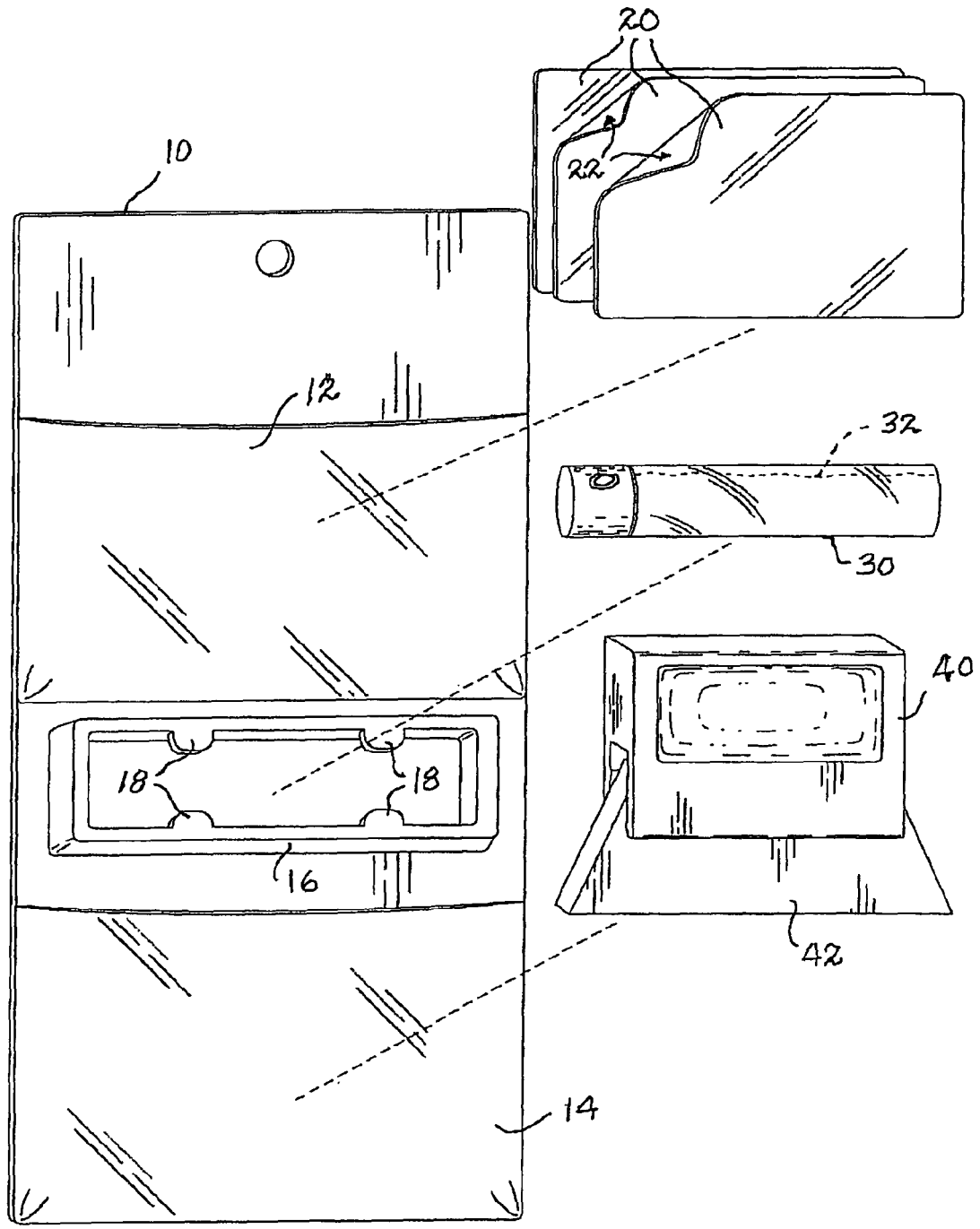
FIG. 1 is an front exploded view of the presently described kit apparatus showing included items.
Figure 2:
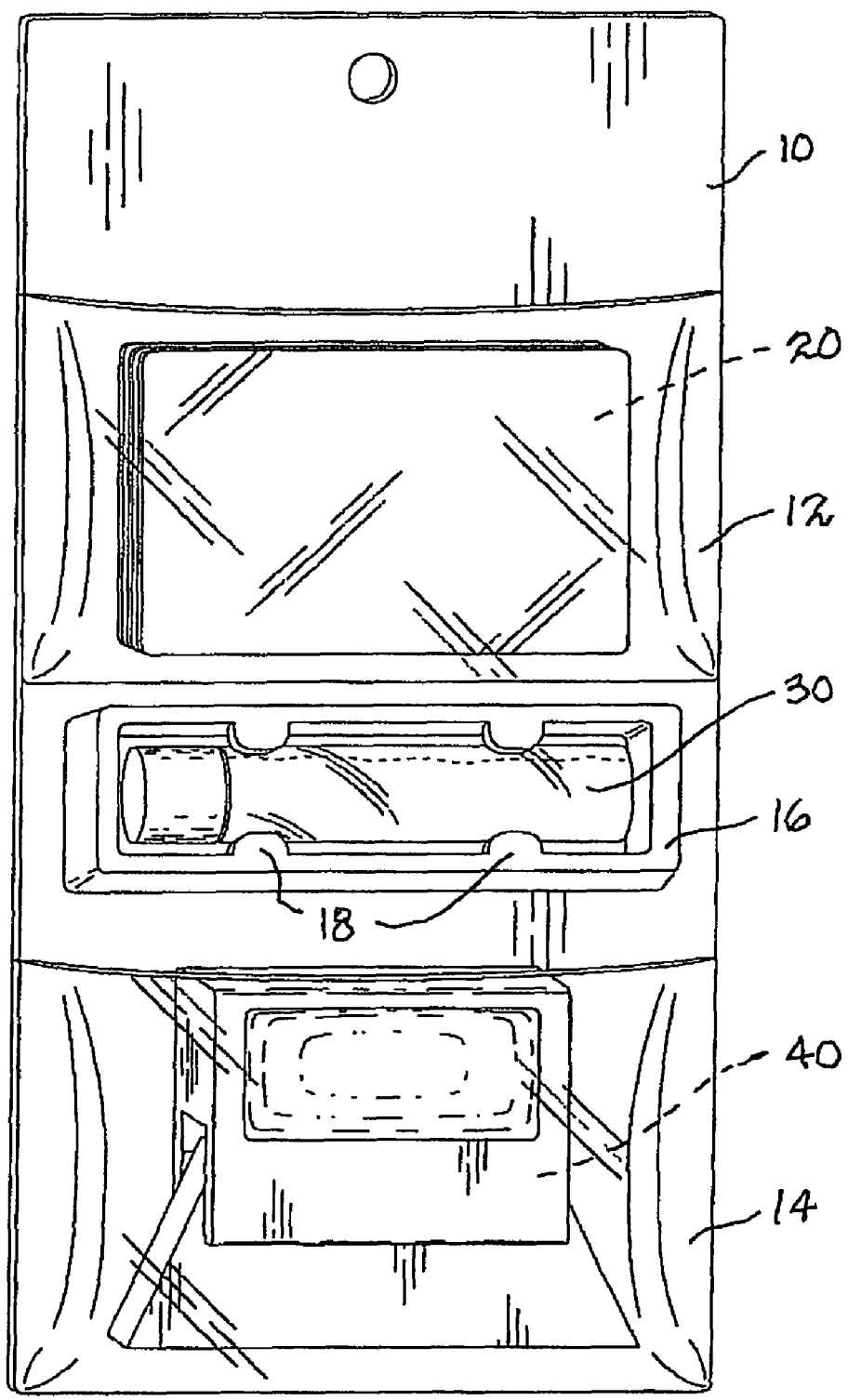
FIG. 2 is a front view thereof as assembled.

Described now in detail is a kit apparatus providing the materials and tools necessary for applying a protective film sheet 20 to an electronic device 4 and especially a display 5 thereof. The kit apparatus, as shown in FIG. 1, includes a package 10 that may be a molded support card, a folded paper box or any similar container made of plastic, paper, cardboard or other materials. The package 10, in one embodiment, provides two pockets 12 and 14 separated by a molded recess 16. However, the package may be structured in alternative ways with more or less recesses, pockets and/or other means for securing the materials and tools. The term "pocket 12" is used herein to mean any article that may be used for securing the materials and tools in commercial enterprise.

At least one, but preferably, a plurality of Film sheets 20 are secured within a first one of the pockets 12. These sheets 20 are preferably cut to the exact size of the electronic display screen 5 that they are to be mounted on so that no cutting and minimal fitting steps are necessary in using the kit. The sheets 20 are preferably made of an optically clear film of a hard and scratch resistant type such as polyurethane or polycarbonate and are preferably between 0.5 and 6.0 thousandths of an inch in thickness, wherein such a thickness range provides the required flexibility and durability necessary to the present application. Film thicknesses below 0.5 thousandths of an inch are subject to tearing and are difficult to handle, while film thicknesses greater than 6.0 thousandths of an inch tend to be excessively rigid for the present application so that they tend to lift from the surface due to thermal expansion of the film relative to the attachment surface which may be metal, plastic or glass. The sheets 20 are coated on one side with an adhesive 22 that is activated by a solution; preferably alcohol, but may also be water or an aqueous solution. Such activated adhesives are vary well known in the art and are used in commercial tinting of building and automobile window glass.

A miniature bottle 30 containing a cleaning and activating solution 32 is secured within the molded recess 16. Such miniature bottles 30 are well known in the art and in the present application is preferably a manually operated spray bottle. The solution 32 is preferably a substance that is environmentally friendly, is a good degreasing agent and is capable of dissolving the adhesive material on the film sheets 20, i.e., for activation. Other combinations of adhesive and solution such as a water soluable adhesive and water in the spray bottle 30 my be used in place of alcohol, however, alcohol has been found to provide superior results.

A miniature squeegee 40 is secured within a second one of the pockets 14. Such a squeegee 40 is small and preferably has a blade 42 of a length not greater than one side of the film sheet 20. This is desirable in case the display surface is recessed since it is necessary for the squeegee 40 to be drawn across all parts of the sheet 20 as will be described.

Preferably plural tabs 18 extend over the recess 16 in positions for holding the spray bottle 30 securely within the recess 16. Clearly, other means may be used to assure that the tools are held in place on or in the package 10.

Figure 3:
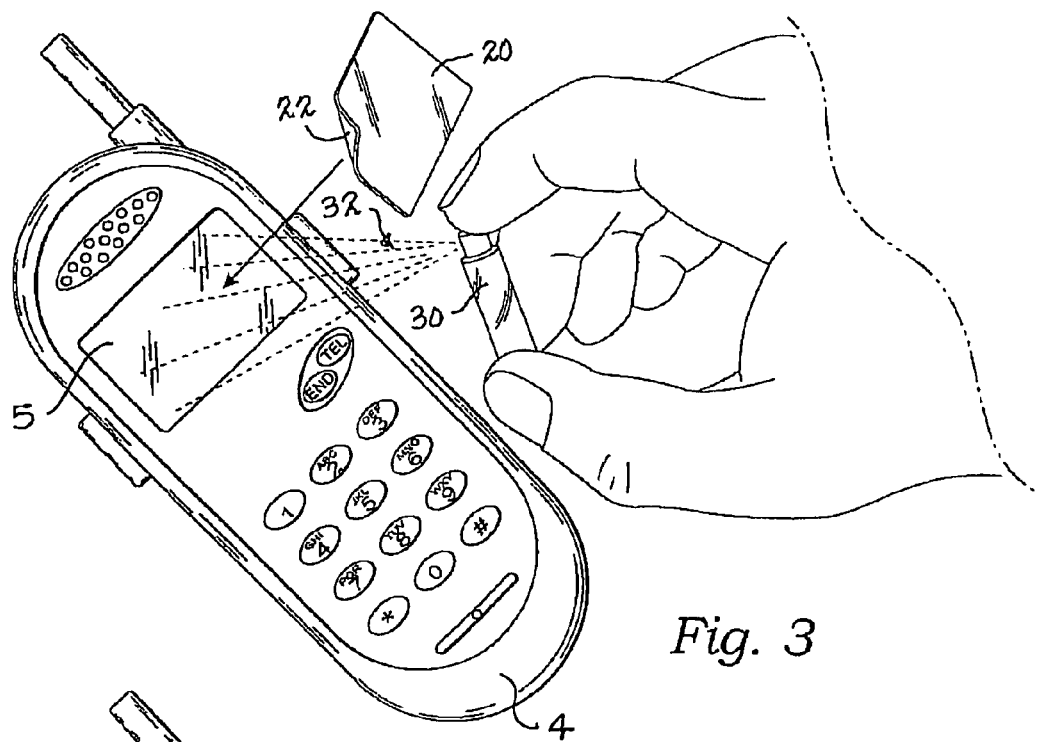
FIG. 3 is a perspective view showing a surface preparation step in using the present invention.
Figure 4:
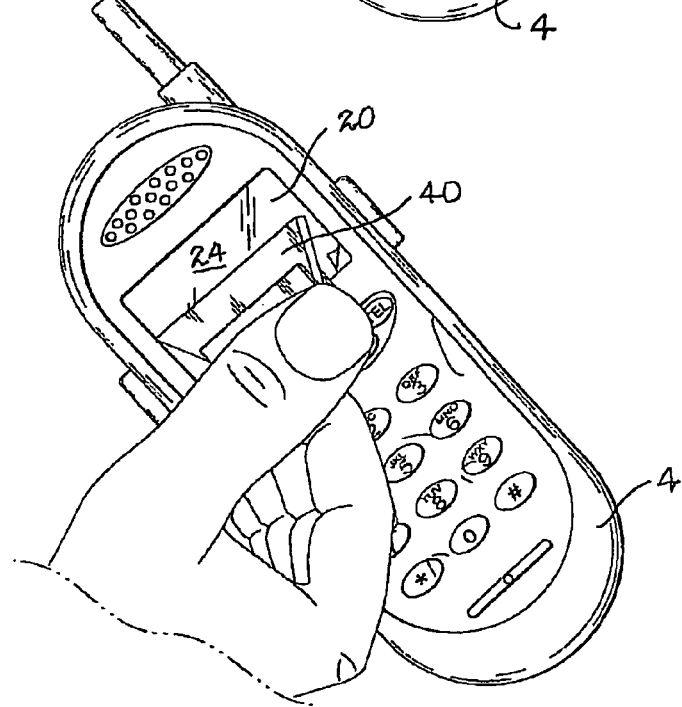
FIG. 4 is a perspective view showing a finishing step in using the present invention.

Described now in detail is a method for the installation of the film sheet onto an electronic display 5 or onto other portions of an electronic device 4. At least one film sheet 20 is provided as well as the bottle 30 containing the cleaning and activating solution 32 and a squeegee 40. The cleaning and activating solution 32 is sprayed or otherwise deposited onto the electronic display 5 and is then wiped off from the electronic display 5 with the squeegee 40 or otherwise. This step is to remove dust, dirt or grease from the surface. Next, the cleaning and activating solution 32 is deposited onto the electronic display 5 again and the film sheet 20 is placed onto the electronic display 5 with the adhesive layer 22 of the film sheet 20 in contact with the electronic display 5 as shown in FIG. 3. The film sheet 20 is positioned on the electronic display 5 with mutual registration and alignment, and, while holding the film 20 in place manually the solution is pressed out from between the film sheet 22 and the electronic display 5 using the squeegee 40 for applying pressure on an outer surface 24 of the film sheet 20.

The enablements described in detail above are considered novel over the prior art of record and are considered critical to the operation of at least one aspect of the apparatus and its method of use and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted only in conjunction with the appended claims and it is made clear, here, that each named inventor believes that the claimed subject matter is what is intended to be patented.

What is claimed is:

1. A kit apparatus for protecting an electronic device comprising: a package; the package containing at least one film sheet of an optically clear material, each sheet having an adhesive layer on one side thereof; a means for holding or containing a solution, the solution for activating the adhesive layer of the at least one film sheet; and a squeegee; the at least one film sheet, squeegee and bottle secured within at least one pocket of the package.

2. The kit apparatus of claim 1 wherein the at least one film sheet corresponds in size to an outfacing surface of the electronic device.

3. The kit apparatus of claim 2 wherein the squeegee is formed having a squeegee edge capable of fitting on a display of the electronic device.

4. The kit apparatus of claim 1 wherein the optically clear material comprising the at least on film sheet is between 0.5 and 5.0 thousandths of an inch in thickness.

5. The kit apparatus of claim 1 wherein the squeegee is formed having a squeegee edge of a length not greater than an edge of one of the at least one film sheet.

6. A kit apparatus for protecting an electronic device comprising: a package; the package containing a plurality of film sheets of an optically clear material, each of the sheets having a thickness between 0.5 and 5.0 thousandths of an inch, each of the sheets having an adhesive layer on one side thereof; a means for holding or containing a solution, the solution enabled for activating the adhesive layer of the film sheets; and a squeegee having a squeegee edge of a length not greater than an edge of one of the film sheets; the film sheets, squeegee and bottle secured within the package.

7. The kit apparatus of claim 6 wherein at least one of the film sheets corresponds in size to an outfacing surface of the electronic device.

8. A combination electronic device and a kit apparatus for protecting the electronic device, the combination comprising:
   a) an electronic device having a surface for being protected; and
   b) a package containing a plurality of film sheets of an optically clear material wherein each of said film sheets is between 0.5 and 5.0 thousandths of an inch in thickness, each of the sheets having an adhesive layer on one side thereof; a means for holding or containing a solution for activating the adhesive layer of the film sheets; and a squeegee having a squeegee edge of a length not greater than an edge of one of the Elm sheets; the film sheets, squeegee, and bottle secured within at least one pocket of the package.

9. The combination electronic device and kit apparatus of claim 8 wherein at least one of the film sheets corresponds in size to an outfacing surface of the electronic device.

10. A method of installing a film sheet onto a surface of an electronic device; the method comprising the steps of:
   a) providing, in a package, the film sheet, wherein the film sheet has an adhesive layer on one side thereof; a means for holding or containing a solution; and a squeegee;
   b) wetting the surface of the electronic device with the solution a first time;
   c) moving the film sheet into a position corresponding with the surface of the electronic device thereby achieving mutual registration therewith; and
   d) holding the film sheet in place manually while sliding the squeegee over the film sheet, thereby disbursing the solution from between the film sheet and the surface of the electronic device.

11. The method of claim 10 comprising, between the steps of wetting the surface and moving the film sheet into position, the further steps of:
  e) wiping the solution from the surface of the electronic device with the squeegee; and
  f) wetting the surface of the electronic device with the solution a second time.

* * * * *